United States Patent
Zaras

(10) Patent No.: US 6,625,644 B1
(45) Date of Patent: Sep. 23, 2003

(54) PROCESS AND SYSTEM FOR SEARCHING WEBPAGES WITHIN A WEBSITE

(75) Inventor: David S Zaras, Glen Allen, VA (US)

(73) Assignee: GE Financial Assurance Holdings, Inc., Richmond, VA (US)

(*) Notice: Subject to any disclaimer, the term of this patent is extended or adjusted under 35 U.S.C. 154(b) by 0 days.

(21) Appl. No.: 09/568,575

(22) Filed: May 11, 2000

(51) Int. Cl.[7] .............................................. G06F 15/173
(52) U.S. Cl. ...................................................... 709/217
(58) Field of Search ................................. 709/217, 203

(56) References Cited

U.S. PATENT DOCUMENTS

| | | | |
|---|---|---|---|
| 5,742,768 A | | 4/1998 | Gennaro et al. |
| 5,890,172 A | | 3/1999 | Borman et al. |
| 5,956,709 A | | 9/1999 | Xue |
| 6,101,486 A | * | 8/2000 | Roberts et al. ................ 705/27 |
| 6,128,655 A | | 10/2000 | Fields et al. |
| 6,327,589 B1 | * | 12/2001 | Blewett et al. ................. 707/5 |
| 6,344,851 B1 | * | 2/2002 | Roberts et al. ............. 345/418 |

* cited by examiner

*Primary Examiner*—David Y. Eng
(74) *Attorney, Agent, or Firm*—Hunton & Williams LLP

(57) ABSTRACT

A system and method for performing an internal search of a website using a portion of an address. A requester transmits an address, such as a universal resource locator (URL) address, comprising a website portion and a webpage portion. If the address, with the webpage portion, does not correspond to a particular webpage in the website, a search of the website is performed based on the webpage portion. Results of the search are displayed to the requester, such as in the form of links to webpages within the website. The requester may activate the appropriate link to access the desired page.

21 Claims, 3 Drawing Sheets

PROCESS AND SYSTEM FOR SEARCHING WEBPAGES WITHIN A WEBSITE

FIELD OF THE INVENTION

The present invention relates generally to a system and method for searching for a specific webpage within a website, and more particularly for using a component from the website address to internally search for a webpage within the website.

BACKGROUND OF THE INVENTION

The Internet, including the World Wide Web, has rapidly grown in recent years, with large amounts of information available. Websites continue to be added to the Internet, and many websites are growing, as increasing numbers of webpages are added to them. In general, a website comprises one or more webpages which are related, or linked, to each other, where the website has a unique address, referred to as a universal resource locator (URL), associated with the website. Webpages within the website will also have their own unique addresses. Commonly, the home page of a website will have the default address (e.g., www.website.com), while the other webpages will have an address with a website component and a webpage component. For example, a webpage may have an address of "www.website.com/stuff," where "www.website.com" is the website component and "stuff" is the webpage component.

Although the Internet and World Wide Web (the "Web") contain vast amounts of information on just about every topic imaginable, it is not always easy for a user to navigate the Web and retrieve information relevant to the user's area of inquiry. This is in part because websites and webpages are stored on servers throughout the world. But, the Internet and the World Wide Web are like vast libraries without indexes or card catalogs. Thus, various technologies have been developed to assist users in locating particular information within the computers and servers connected over the Internet. For example, websites and webpages may be viewed using standard web "browsing" software such as Netscape's NAVIGATOR® and Microsoft's INTERNET EXPLORER® applications. Service providers such as Microsoft, Alta Vista, Yahoo!, Excite, InfoSeek, Lycos, and others provide "search engines" which help users find information on the Web.

However, there are a number of deficiencies in the current commercially-available search engines. In order to use a search engine, a user desiring to locate information on a particular subject will typically input and submit a search query comprising one or more search terms or key words to the search engine. The search engine typically is programmed to scan through an index of webpages which the particular search engine maintains for those webpages which contain search terms entered by the user. The search engine retrieves all webpages containing such search terms from among the webpages stored in its index, and serves to the user a listing of URLs for each such webpage. In many cases, the search engine will retrieve more web pages than those which are actually relevant to the user's search query merely because the webpage may by happenstance include one or more of the search terms or key words input by the user. The user may then be required to sort through the multiple irrelevant websites and/or webpages to find the desired information. Furthermore, the search engine's list of URLs may include discontinued links, i.e., URLs for webpages which are no longer available. The user selecting such a URL may be presented with a blank page and a message indicating that the page cannot be displayed (e.g., "HTTP 404 Not Found").

The user may reduce his/her time spent searching if he/she knows the address or URL of a particular website. However, in many cases, the user may know the URL for the homepage of the website, but not know the URL for a particular desired webpage within such website. Thus, the user may have to manually search within the website to find the desired webpage. This may require moving through a number of pages, and reviewing information which may not be desired by, or relevant to, the information sought by the user.

Some websites allow a user to search for a particular subject matter by a search engine within the website. Such a search engine may suffer from the drawback of requiring that the user first find the search engine within the website. Further, the user then is required to manually input the search term once the search engine is found. Even after the search engine is found, this may not substantially improve upon the user's manual search through the website.

These and other drawbacks with current search engine technologies exist.

SUMMARY OF THE INVENTION

An object of the present invention is to overcome these and other drawbacks in existing systems and methods.

Another object of the invention is to provide a process and system for internally searching in a website for a particular webpage.

A further object of the invention is to provide a process and system for conducting searches for and retrieving information from webpages which are more efficient than current processes and/or systems because the process and system of the present invention does not retrieve irrelevant information in addition to relevant information.

Additional objects and advantages of the invention will be set forth in part in the description, or may be learned by practice of the invention. The objects and advantages of the invention may be realized and attained by means of instrumentalities and combinations particularly pointed out in the appended claims.

To achieve these objects and in accordance with the purpose of the invention, as embodied and broadly described herein, a process for searching for a webpage internal to a website comprising a plurality of webpages, comprises the steps of: receiving from a requester an address corresponding to the website, the address comprising a website component and a webpage component; performing a search of the website based on the webpage component; and transmitting the search results to the requester.

In another aspect, a system for searching for a webpage internally within a website comprising a plurality of webpages comprises a receiver module for receiving from a requester an address corresponding to the website, the address comprising a website component and a webpage component; a central controller module for performing a search of the website based on the website component; and a transmitter module for transmitting the search results to the requester.

The accompanying drawings, which are incorporated in and constitute a part of this specification, illustrate an embodiment of the invention and, together with the description, serve to explain the principles of the invention.

DETAILED DESCRIPTION OF IMBODIMENTS OF THE INVENTION

Figure 1:
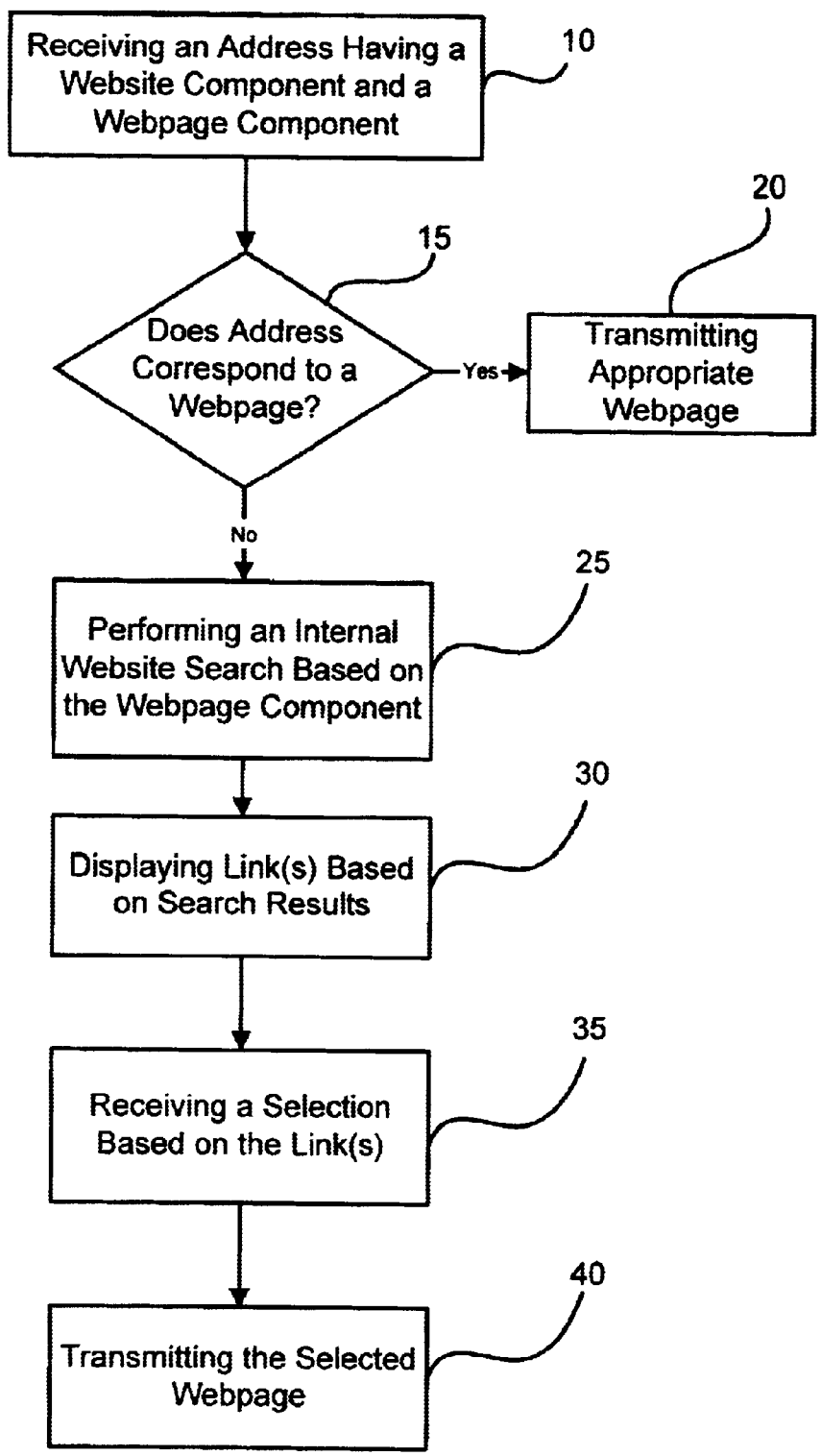
FIG. 1 is a flowchart illustrating the steps in the process for internally searching for a webpage internal to a website according to an embodiment of the invention.

Reference will now be made in detail to the present preferred embodiment of the invention, an example of which is illustrated in the accompanying drawings, in which like reference characters refer to corresponding elements.

The present invention is described in relation to a system and method for conducting an internal search of a website for a specific webpage within such website. However, it is understood that the present invention may be used for other manners of using website address components to search within websites located in the Internet.

FIG. 1 is a flowchart illustrating steps in a process for conducting an internal search of website according to an embodiment of the invention. The process of the present invention begins at step 10, wherein a requester having access to the Internet inputs an address for a desired website on the Internet, where the address comprises a website component and a webpage component. The input address is received, such as by a server linked to the Internet, which server has a website corresponding to the input address stored in a memory therein.

Figure 3:
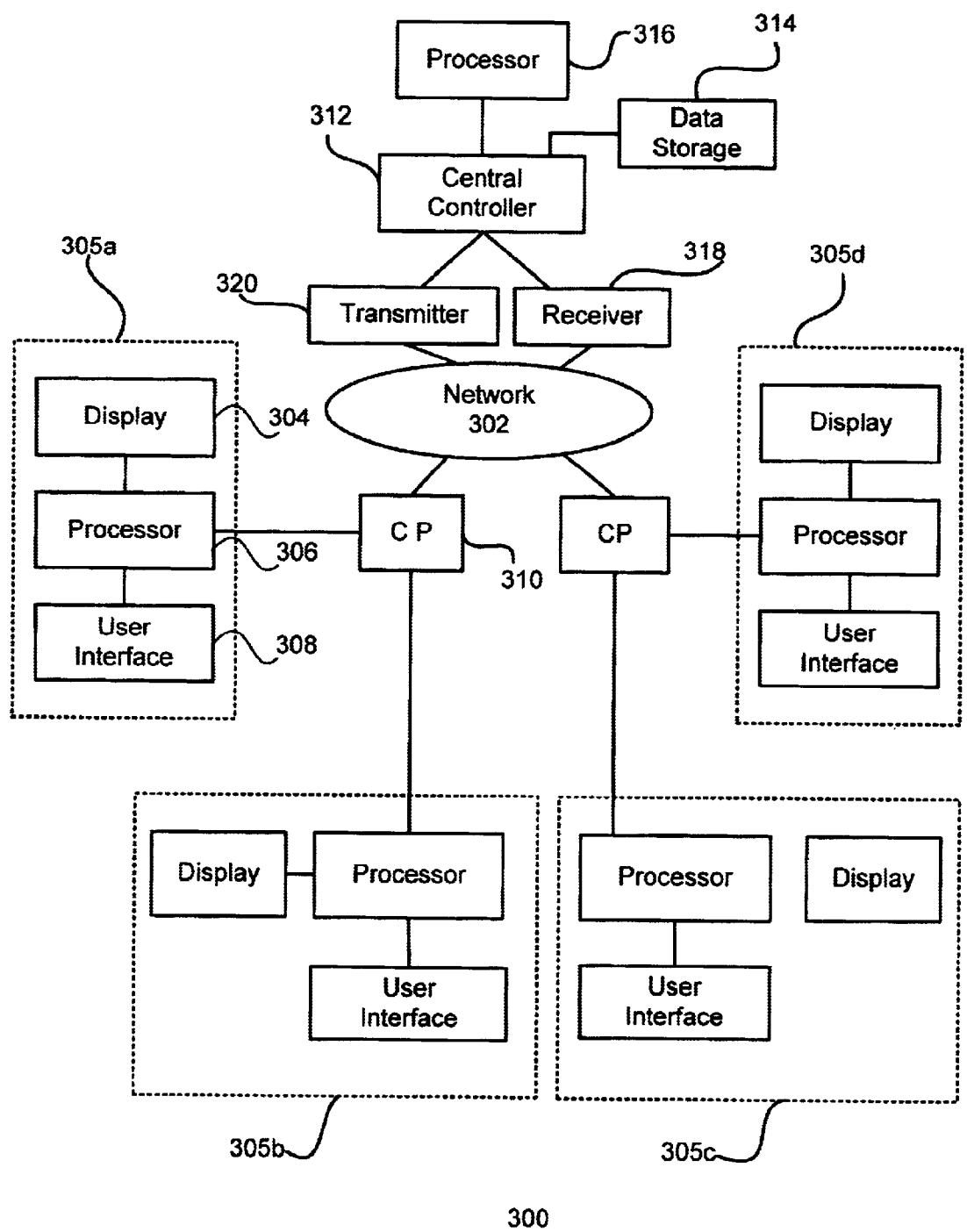
FIG. 3 is a schematic diagram of a system for conducting an internal search of a website according to an embodiment of the invention.

According to an embodiment of the invention, a system 300 as shown in FIG. 3 may be used with the process of the present invention. System 300 in FIG. 3 will be described in greater detail below. A requester using a personal computer having access to the Internet inputs an address for a desired website into the requester's browser software. As noted above, the input address comprises a website component and a webpage component. According to an embodiment of the invention, the input address may be a universal resource locator (URL) address. Other manners of addresses may also be used.

Figure 2A:
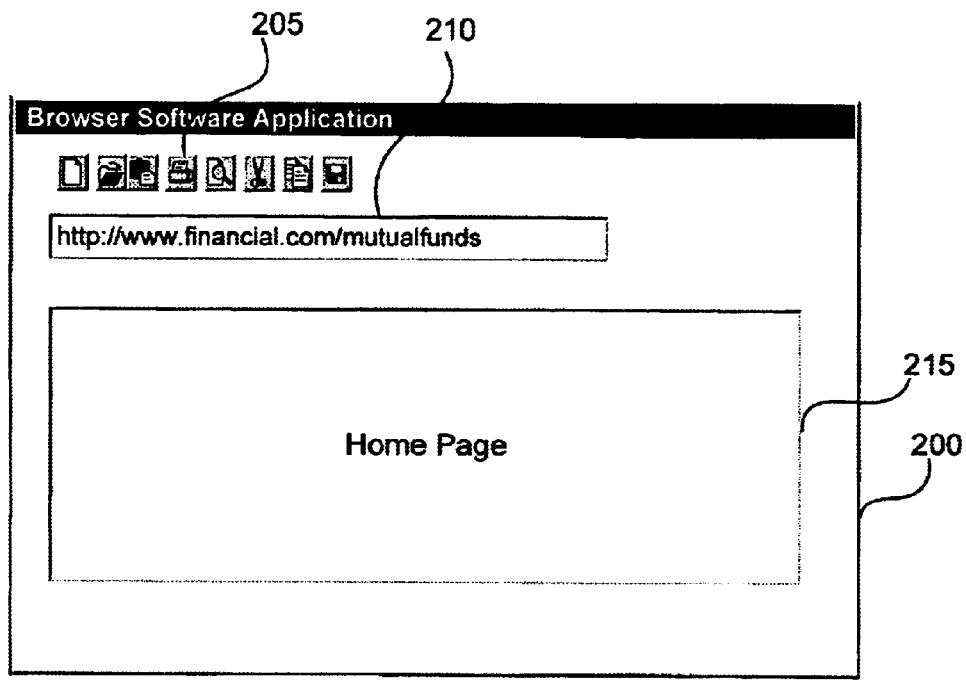
FIGS. 2a and 2b are illustrations of graphical user interfaces for searching a website according to an embodiment of the invention.
Figure 2B:
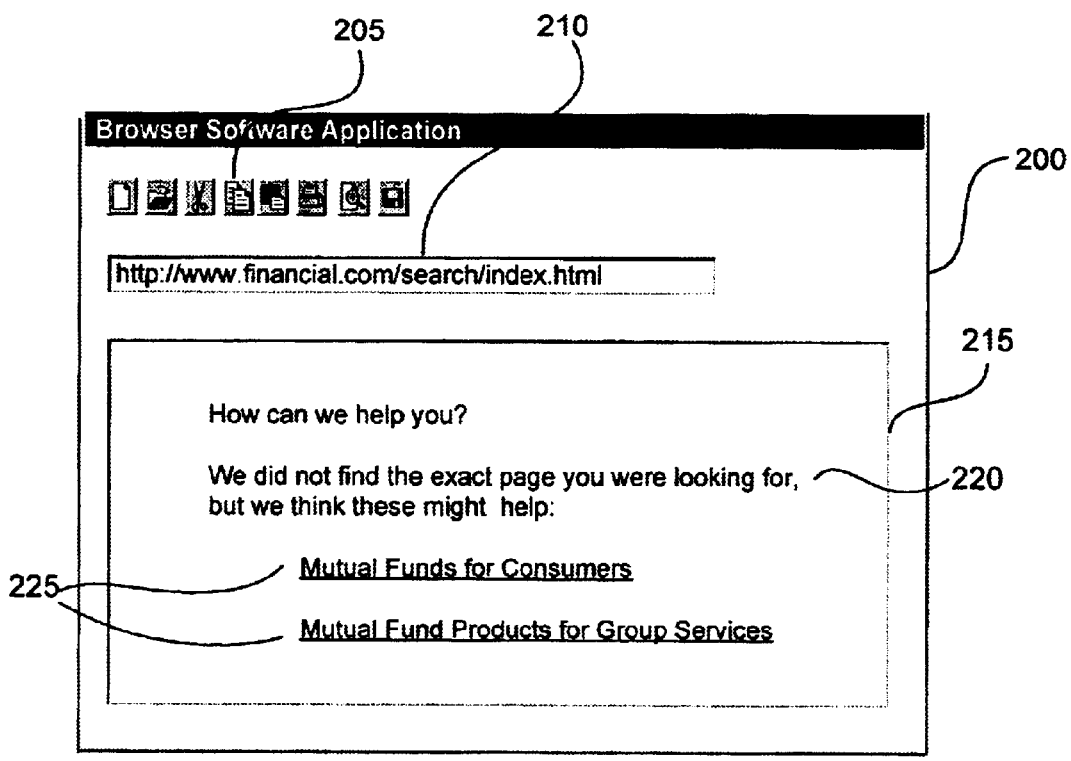

By way of example, as illustrated in FIG. 2a, the requester uses a browser software application 200 (e.g., Netscape's NAVIGATO®, Microsoft's INTERNET EXPLORER®, etc.) on a personal computer. Browser 200 comprises a toolbar 205, an address bar 210, and a display 215. Toolbar 205 comprises standard toolbar functions, such as print, copy, cut, paste, stop, home, back, and other functions typically associated with standard browser software applications. The toolbar functions described herein and illustrated in FIGS. 2a and 2b are merely illustrative and are not in any manner limiting. Display 215 displays the desired website and/or webpages. Address bar 210 includes the address of the particular website and/or webpage presently reviewed by the requester. According to this example, the requester wants to find mutual fund information from the website "www.financial.com," but does not know where the desired information is located within the website. The requester may therefore input the address "http://www.financial.com/mutual funds" into address bar 210. According to this example, the "www.financial.com" portion of the input is the website component, and the "mutual funds" portion of the input is the webpage component. The browser transmits the input address requested to the appropriate server (e.g., the server having stored in memory therein the website having the website portion of the input address) in a conventional manner for accessing a website using an address as a search request.

At step 15 of the process, a determination is made whether the webpage portion of the input address corresponds to an address of a specific webpage within the website. Such a determination may be made in a conventional manner for a server to find webpages corresponding to an input address. If a webpage within the stored website is found that corresponds to the webpage portion of the input address, the appropriate webpage is transmitted to the requester for display at step 20. Transmission and display of the webpage may be conducted in a manner of transmission and display of a webpage known to those of ordinary skill in the art.

If the webpage portion of the input address does not correspond to an address of a webpage within the stored website, an internal search of the website is performed based on the webpage component of the input address at step 25. According to an embodiment of the invention, the search may be performed by selecting the webpage component of the address and inputting it as a search request into an internal search engine, i.e. a search engine which is located within the stored website. Using the webpage component of the website address, the internal search engine searches the website for the term using traditional search techniques employed by standard search engines, wherein the search engine scans the text of the webpages internal to the stored website for any webpages, wherein the text of such webpages includes instances of the terms matching the webpage portion of the input website address. According to another embodiment of the invention, the search may be performed by selecting the webpage component of the address and inserting it into a search engine external from the website. Using the webpage component of the input website address, the external search engine searches the website for webpages wherein the text of such webpages includes text matching the webpage portion of the input website address. For either embodiment (internal search engine or external search engine), the search engine may be any type of search engine, such as search engines which may be purchased from Alta Vista, Excite, Microsoft, Yahoo!, Lycos, Infoseek, or other search engine manufacturers.

At step 30 of the process, the search results are transmitted to the requester. According to an embodiment of the invention, the results of the search performed by the search engine in step 25 are displayed to the requester, such as on a monitor or other display device 308 (see FIG. 3), and comprise a message and one or more links for the requester to activate, wherein the links correspond to webpages within the stored website. By way of example, as illustrated in FIG. 2b, a graphical user interface for a typical browser application 200, may be displayed to the requester. Address bar 210 displays an index address for displaying the internal search results to the requester in display 215. Display 215 may include a message 220 and one or more links 225. Each link 225 may be associated with a particular webpage within the stored website. The links 225 enable a requester to access the appropriate webpage. In the present example, the display 215 includes a message 220 indicating that the desired webpage having an address matching the webpage portion of the input address could not be found. Display 215 also provides two links 225, one link 225 for accessing a webpage within the website containing information for consumer mutual funds, and another link 225 for accessing a webpage within the website containing information for mutual funds for group services. The requester may then activate (e.g., activate by clicking a mouse to select) the link 225 of interest, thereby displaying the appropriate webpage associated with the activated link 225.

At step 35, the requester activates a link 225 and the selection of an activated link 225 is received from the requester. As described above, the selection activated link 225 may be received at a server connected to the Internet, such as the server on which the website is stored. At step 40 in the process, the server retrieves the webpage corresponding to the activated link 225 and serves the webpage to the computer of the requester, whereby the webpage is displayed on the requester's display 308 (see FIG. 3). The receiving and transmitting of steps 35 and 40 may be performed in a manner known in the art of web site transmission. Other manners of receiving and transmitting information may also be used.

The present invention enables a requester to retrieve desired information contained in a website without having to sort through a lot of irrelevant information on his/her own. A requester can use a search term, in the form of a webpage component of an address of a particular website. If the webpage portion of the input address corresponds to a webpage within the website, the webpage is retrieved and displayed to the requester. If the webpage portion of the address does not correspond to an address of a webpage within a website, an automatic search of the website is performed, whereby the webpage portion of the input address is used to define a search term employed as a search query for a search engine. The search engine may be found within the website, or may be external from the website, and searches the webpages located within the website. This automatic search helps to reduce the number of errors (e.g., "HTTP 404 Not Found") that a requester receives.

Further, a website with an automatic search capability enables a requester to retrieve desired information from the website more efficiently. A requester is not required to manually search through every webpage within a website to retrieve desired information. Ease in retrieving the desired information of interest will encourage requesters to return to a website, thereby increasing traffic to the website, which in many cases may result in increased revenues to the operator of the website.

FIG. 3 illustrates a System 300 according to an embodiment of the present invention. System 300 comprises multiple requester devices 305 (or "computers") used by requesters to connect to Network 302 through multiple Connector Providers (CPs) 210. Network 302 may be any network that permits multiple requesters or computers to connect and interact. According to an embodiment of the invention, Network 302 may be comprised of a dedicated line to connect requester, such as the Internet, an intranet, a local area network (LAN), a wide area network (WAN), a wireless network, or other type of network. CP 310 may be a provider that connects the requesters to the network 302. For example, CP 310 may be an internet service provider (ISP), a dial-up access means, such as a modem, or other manner of connecting to network 302. In actual practice, there may be significantly more users connected to System 300 than shown in FIG. 3. This would mean that there would be additional requesters which are connected through the same CPs shown or through other CPs. Nevertheless, for purposes of illustration, the discussion will presume four requester devices 305 are connected to Network 302 through two CPs 310.

According to an embodiment of the invention, requester devices 305a–305d may each make use of any device (e.g., computer, wireless telephone, personal digital assistant, etc.) capable of accessing Network 302 through CP 310. Alternatively, some or all of requester devices 305a–305d may access Network 302 through a direct connection, such as a T1 line, or similar connection. FIG. 3 shows four requester devices 305a–305d, each having a connection to Network 302 through a CP 310a and 310b. Requester devices 305a–305d may each make use of a personal computer such as a computer located in the requester's home, or may use other devices which allow the requester to access and interact with others on Network 302. Central controller module 312 may also have a connection to Network 302 as described above. Central controller module 312 may communicate with one or more data storage modules 314, the latter being discussed in more detail below.

Each computer 305a–305d used by requesters may contain a processor module 304, a display module 308, and a user interface module 306. Each computer 305a–305d may have at least one user interface module 306 for interacting and controlling the computer. The user interface module 306 may be comprised of one or more of a keyboard, joystick, touchpad, mouse, scanner or any similar device or combination of devices. Each of the computers 305a–305d used by requesters may also include a display module 308, such as a CRT display or other device.

System 300 further includes a central controller module 312. Central controller module 312 may maintain a connection to Network 302 such as through transmitter module 318 and receiver module 320. Transmitter module 318 and receiver module 320 may be comprised of conventional devices which enable central controller module 312 to interact with Network 302. According to an embodiment of the invention, transmitter module 318 and receiver module 320 may be integral with central controller module 312. The connection to Network 302 by central controller module 312 and computers 305 may be a high speed, large bandwidth connection, such as a though T1 or T3 line, a cable connection, a telephone line connection, DSL connection, or other type connection. Central controller module 312 functions to permit requester's devices 305a–305d to interact with each other in connection with various applications, messaging services and other services which may be provided through System 300.

Central controller module 312 preferably comprises either a single server computer or a plurality of multiple server computers configured to appear to clients 305 as a single resource. Central controller module 312 communicates with a number of data storage modules 314. Each data storage module 314 stores various information associated with a website and webpages, including multimedia content, formatting, audio and video components, among other information. According to an embodiment of the invention, any data storage module 314 may be located on one or more data storage devices, where the data storage devices are combined or separate from central controller module 312.

Processor module 316 performs the various processing functions required in the practice of the process taught by the present invention, such as performing the search, generating the search results, generating a message to be sent and displayed for the requester (e.g., message 220 in FIG. 2b), and other similar processing functions. Processor module 316 may be comprised of a standard processor, such as a central processing unit (CPU), which is capable of processing the information in the necessary manner.

While system 300 of FIG. 3 discloses a computer 305 connected to Network 302, it is understood that a personal digital assistant ("PDA"), a mobile telephone, a television, or other device that permits access to Network 302 may be used to arrive at the system of the present invention.

According to another embodiment of the invention, a computer-usable and writeable medium having a plurality of computer readable program code stored therein may be provided for practicing the method of the present invention. For example, the computer-usable medium may comprise a CD ROM, a floppy disk, a hard disk, or any other computer-usable medium. One or more of the components of the system may comprise computer readable program code in the form of functional instructions stored in the computer-usable medium such that when the computer-usable medium is installed on a computer system, those components cause the computer system to perform the functions described.

According to one embodiment, central controller module 312, data storage 314, processor module 316, receiver module 318, and transmitter module 320 may comprise computer-readable code that, when installed on a computer, perform the functions described above. Also, only some of the components may be provided in computer-readable code.

Additionally, various entities and combinations of entities may employ a computer to implement the components performing the above described functions. According to an embodiment of the invention, the computer may be a standard computer comprising an input device, an output device, a processor device, and data storage device. According to other embodiments of the invention, various components may be different department computers within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, a system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A process for searching for a webpage within a website comprising a plurality of webpages, the process comprising the steps of:

receiving from a requester an address comprising a website component and a webpage component, wherein the website component identifies the website and the webpage component does not identify any of the plurality of webpages within the website;

performing a search within the website based on the webpage component; and transmitting the search results to the requester.

2. The process according to claim 1, wherein a portion of the address comprises at least part of a universal resource locator address.

3. The process according to claim 1, wherein the results further comprise at least one link to a webpage located within the website.

4. The process according to claim 1, further comprising the steps of:

receiving at least one selection based on the search results; and transmitting appropriate information based on the at least one selection.

5. The process according to claim 4, wherein:

a) the search results comprise at least one webpage link;

b) the at least one selection is an activation of at least one webpage link; and c) the appropriate information is the webpage corresponding to the at least one webpage link.

6. The process according to claim 1, wherein the step of performing the search further comprises performing the search with a search engine internal within the website.

7. The process according to claim 1, wherein the step of performing the search further comprises performing the search with a search engine external to the website.

8. A process for searching for a webpage within a website comprising a plurality of webpages, the process comprising the steps of:

transmitting an address to a central controller module, the address comprising a website component and a webpage component, wherein the website component identifies to the website and the webpage component does not identify any of the plurality of webpages;

performing a search within the website based on the webpage component where the search is performed at the central controller module; and receiving search results from the central controller module, where the search results are based on an internal search of the website based on the webpage component.

9. The process according to claim 8, wherein a portion of the address comprises at least part of a universal resource locator address.

10. The process according to claim 8, wherein the results further comprise at least one link to a webpage located within the website.

11. The process according to claim 8, further comprising the steps of:

transmitting at least one selection based on the search results; and receiving appropriate information based on the at least one selection.

12. The process according to claim 11, wherein:

a) the search results comprise at least one webpage link;

b) the at least one selection is an activation of at least one webpage link; and c) the appropriate information is the webpage corresponding to the at least one webpage link.

13. The process according to claim 8, wherein the search results are received from a search performed with a search engine internal within the website.

14. The process according to claim 8, wherein the search results are received from a search performed with a search engine external to the website.

15. A system for searching for a webpage within a website comprising a plurality of webpages, the system comprising:

a receiver module for receiving from a requester an address comprising a website component and a webpage component, wherein the website component identifies to the website and the webpage component does not identify any of the plurality of webpages;

a central controller module for performing a search of the website based on the webpage component; and a transmitter module for transmitting the search results to the requester.

16. The system according to claim 15, wherein a portion of the address comprises at least part of a universal resource locator address.

17. The system according to claim 15, wherein the results further comprise at least one link to a webpage located within the website.

18. The system according to claim 15, wherein:

the receiver module further receives at least one selection based on the search results; and the transmitter module further transmits appropriate information based on the at least one selection.

19. The system according to claim 18, wherein:
a) the search results comprise at least one webpage link;
b) the at least one selection is an activation of at least one webpage link; and
c) the appropriate information is the webpage corresponding to the at least one webpage link.

20. The system according to claim 15, wherein performing the search further comprises performing the search with a search engine internal within the website.

21. The system according to claim 15, wherein performing the search further comprises performing the search with a search engine external to the website.

* * * * *